(12) United States Patent
Reed

(10) Patent No.: US 6,665,092 B2
(45) Date of Patent: Dec. 16, 2003

(54) PRINTER APPARATUSES AND METHODS FOR USING THE SAME

(75) Inventor: William Henry Reed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/047,777

(22) Filed: Jan. 15, 2002

(65) Prior Publication Data

US 2002/0113980 A1 Aug. 22, 2002

Related U.S. Application Data

(63) Continuation of application No. 09/164,500, filed on Oct. 1, 1998, now Pat. No. 6,426,801.

(51) Int. Cl.[7] .............................................. G06K 15/00
(52) U.S. Cl. ...................................................... 358/1.6
(58) Field of Search .......................... 358/1.1, 1.6, 1.16, 358/479, 448, 444, 404, 1.13, 1.17, 474, 524; 382/312, 317; 399/2, 107, 108, 110; 710/8, 1, 13, 14, 62, 74, 73, 64

(56) References Cited

U.S. PATENT DOCUMENTS

| | | | |
|---|---|---|---|
| 4,742,375 A | 5/1988 | Kogane et al. | |
| 4,751,583 A | 6/1988 | Levine | |
| 4,759,053 A | 7/1988 | Satomi et al. | |
| 4,965,748 A | 10/1990 | Chang et al. | |
| 5,198,909 A | 3/1993 | Ogiwara et al. | |
| 5,412,490 A | 5/1995 | Kojima et al. | |
| 5,499,113 A | * 3/1996 | Tsuboi et al. ............... 358/1.16 |
| 5,574,533 A | 11/1996 | Itoh | |
| 5,682,441 A | 10/1997 | Ligtenberg et al. | |
| 5,684,601 A | 11/1997 | Endo | |
| 5,757,394 A | 5/1998 | Gibson et al. | |
| 5,796,428 A | 8/1998 | Matsumoto et al. | |
| 5,797,061 A | 8/1998 | Overall et al. | |
| 5,828,461 A | 10/1998 | Kubo et al. | |
| 5,949,469 A | 9/1999 | Stephenson | |
| 5,963,939 A | 10/1999 | McCann et al. | |
| 5,987,614 A | 11/1999 | Mitchell et al. | |
| 5,999,707 A | 12/1999 | Taniguchi et al. | |
| 6,000,864 A | 12/1999 | Hanada | |
| 6,026,215 A | 2/2000 | Fantone et al. | |
| 6,034,785 A | 3/2000 | Itoh | |
| 6,061,665 A | 5/2000 | Baherman | |
| 6,112,014 A | 8/2000 | Kane | |
| 6,356,357 B1 | 3/2002 | Anderson et al. | |
| 6,445,461 B1 | 9/2002 | Ozawa et al. | |

FOREIGN PATENT DOCUMENTS

JP 09039337 A * 2/1997 ............ B41J/29/00

* cited by examiner

Primary Examiner—Arthur G. Evans
(74) Attorney, Agent, or Firm—Geoffrey L. Oberhaus, Esq.; Scott M. Barker, Esq.

(57) ABSTRACT

A stand-alone printer is provided having a first drive for receiving a first computer readable medium, wherein the first computer readable medium is capable of storing at least one digital representation of an image captured by a digital device and wherein the first computer readable medium is adapted to interface with the digital device. The stand-alone printer also includes a printing member for producing on a substrate a pattern associated with the digital representation of the image captured by the digital device and a port for transmitting data to and from the printer, wherein the printer is adapted to interface with a second drive through the port.

22 Claims, 12 Drawing Sheets

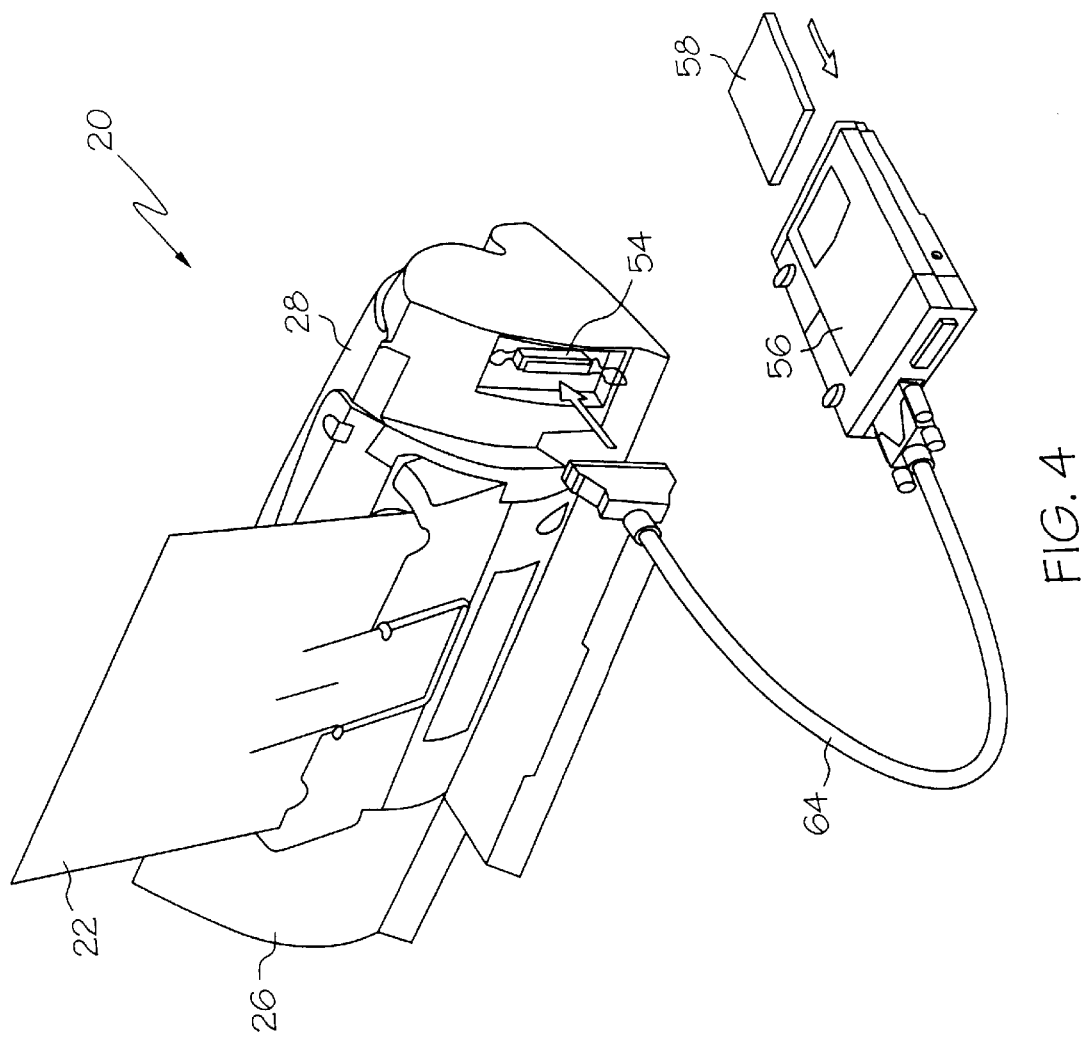

PRINTER APPARATUSES AND METHODS FOR USING THE SAME

This is a continuation of application Ser. No. 09/164,500, filed Oct. 1, 1998, now U.S. Pat. No. 6,426,801 for which priority is claimed, this parent application is incorporated herein by reference in its entirety.

TECHNICAL FIELD OF THE INVENTION

This invention relates to the field printer apparatuses and methods for using the same, and, more particularly, to the field of printer apparatuses which are adapted to print an image captured by a digital device such as a digital camera or scanner.

BACKGROUND OF THE INVENTION

Devices which can capture and digitally store an image on a flash memory card are becoming more commonplace as the cost of these devices and their attendant memory cards continues to decrease. In addition, devices such as digital cameras and scanners are becoming more popular as the resolution of the images captured by these devices continues to improve and approach the quality of traditional film photography.

However, a user of the digital camera must still process the images captured. For example, the user of the digital camera must often tackle the daunting task of processing and printing any digital images captured by the camera. This can include transferring graphic files from the flash memory card to the computer and the subsequent printing of the images from the computer. Also due to the limited storage capacity and relatively high cost of the flash memory cards, the graphic files stored on these memory cards must often be erased to provide room for future images, thereby necessitating the use of a computer and its associated high capacity storage devices (e.g., hard drives, read-write CD-ROMs, etc.) by those individuals who desire to archive these images for later printing or use.

Accordingly, there is a continuing need to provide apparatuses and methods for printing images captured by a digital device which are simple to implement and which can operate independently of a computer system while still providing high capacity archival storage and retrieval of data. There is also a continuing need to provide apparatuses and methods for printing digital images having the previously described features which can also provide the capability of interfacing with a computer system in a traditional manner. In other words, there is a desire to provide a single multi-purpose printer rather than multiple special purpose printers. Due to the "stand-alone" nature of such a desired printer, there is further a need to provide a printer which is upgradeable so that new graphic file formats and functions can be easily accommodated.

SUMMARY OF THE INVENTION

A stand-alone printer is provided having a first drive for receiving a first computer readable medium, wherein the first computer readable medium is capable of storing at least one digital representation (e.g., in the form of a computer graphic file) of an image captured by a digital device and wherein the image has a first horizontal length and a first vertical length inside of which the entire image can be displayed. The first computer readable medium is also adapted to interface with the digital device.

The stand-alone printer includes a printing member for producing on a substrate a pattern associated with the digital representation of the image captured by the digital device and a port for transmitting data to and from the printer. The printer can interface with a second drive through the port, wherein the second drive is interconnected with the printer by a cable so that the first drive and the second drive are in data communication with each other. The stand-alone printer preferably includes a controller having a set of instructions for interpreting the digital representation stored on the first computer readable medium, wherein the controller is adapted to update the set of instructions using data received from one of the first drive or the second drive.

The printer can print the image in a variety of formats. For example, the printer can be adapted to print the image with the first horizontal length and a second vertical length less than the first vertical length so that less than the entire image is printed (i.e., in a panoramic format). In addition, the printer can print the image with a second vertical length less than the first vertical length and a second horizontal length less than the first horizontal length so that less than the entire image is printed, but what is printed is enlarged.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 4 is a rear perspective view of the exemplary printer of FIG. 1, wherein a third drive is shown;

DETAILED DESCRIPTION OF THE PREFERRED EMBODIMENTS

Reference will now be made in detail to the presently preferred embodiments of the invention, examples of which are illustrated in the accompanying drawings, wherein like numerals indicate the same elements throughout the views. As will be appreciated, the present invention, in its most preferred form, is directed to a stand-alone printer which is capable of printing images captured by a digital device, such as a camera or scanner, and which further preferably includes a high capacity archival storage capability. As used herein, the phrase "stand alone" is intended to refer to a device which can operate independent of and without connection to a computer system, although preferred embodiments of the present invention still have the capability of interfacing with a computer system in the alternative.

Figure 1:
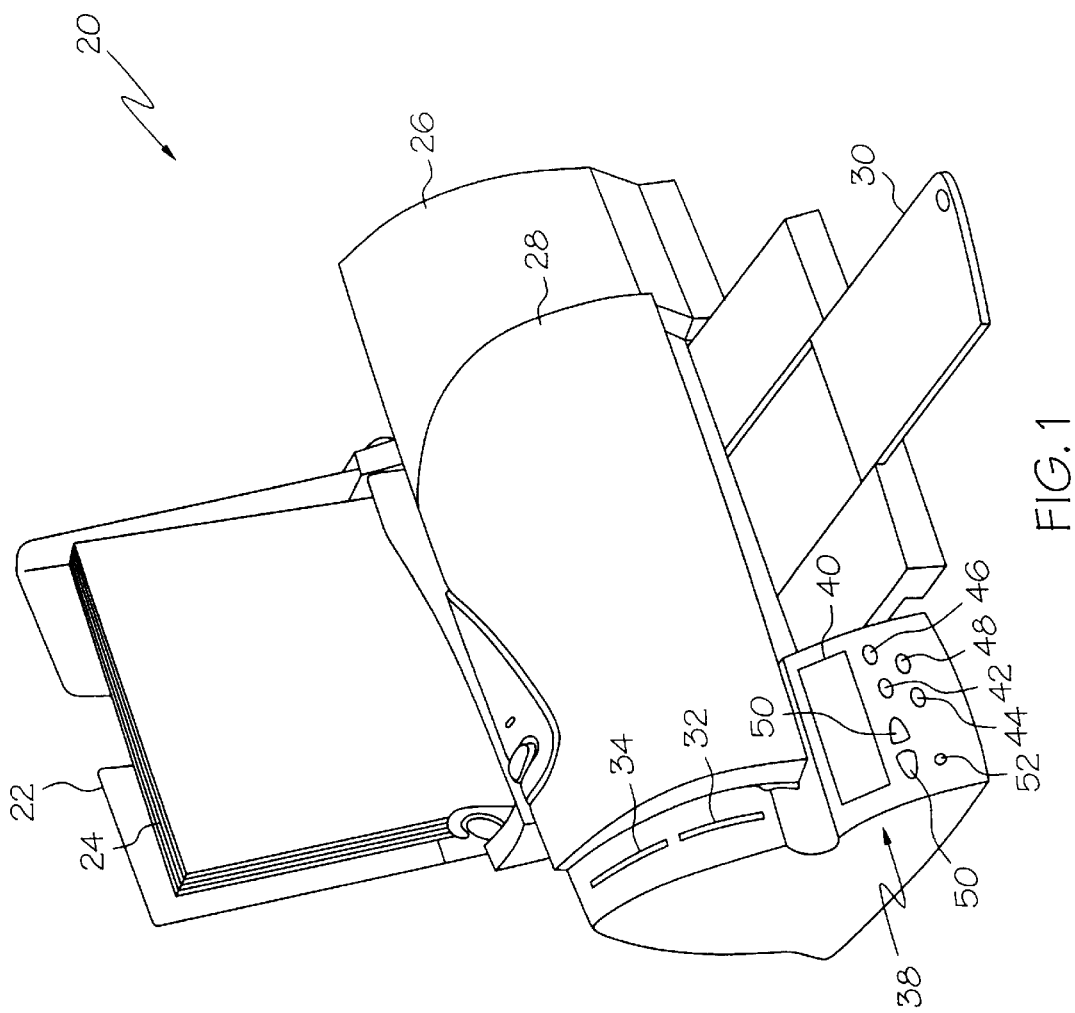
FIG. 1 is a front perspective view of an exemplary printer made in accordance with the present invention.

As shown in FIG. 1, an exemplary stand-alone printer 20 made in accordance with the present invention comprises a sheet feeder 22 for storing and facilitating movement of one or more substrate sheets 24 through the printer 20, a housing 26 having a rotatable cover 28, and an exit tray 30 for receiving the sheets 24 after they have been fed through the printer 20 from the sheet feeder 22. The sheets 24 can be provided as conventional plain paper or in the form of glossy film or photo paper, index cards, labels, envelopes, transparencies, coated paper, etc.

The printer 20 also comprises a first drive 32 and a second drive 34 for receiving a computer readable medium. As used herein, the term "drive" is intended to mean a structure which is capable of interfacing with (e.g., reading and/or writing to) a computer readable medium. As such, a drive may be adapted to interface with, for example, a spinning magnetic disk or a stationary solid state card. Suitable drives can be provided in the form of a floppy drive, a tape drive, an optical drive, a flash memory drive, or any other device capable of reading and/or writing to a computer readable medium. The computer readable medium suitable for use with the first and second drives can be any storage medium having a specific physical substrate configuration which is capable of interfacing with a digital device, such as a camera or scanner, and which is capable of storing one or more digital representations of an image captured by the digital device in the form of computer graphic files.

Figure 2:
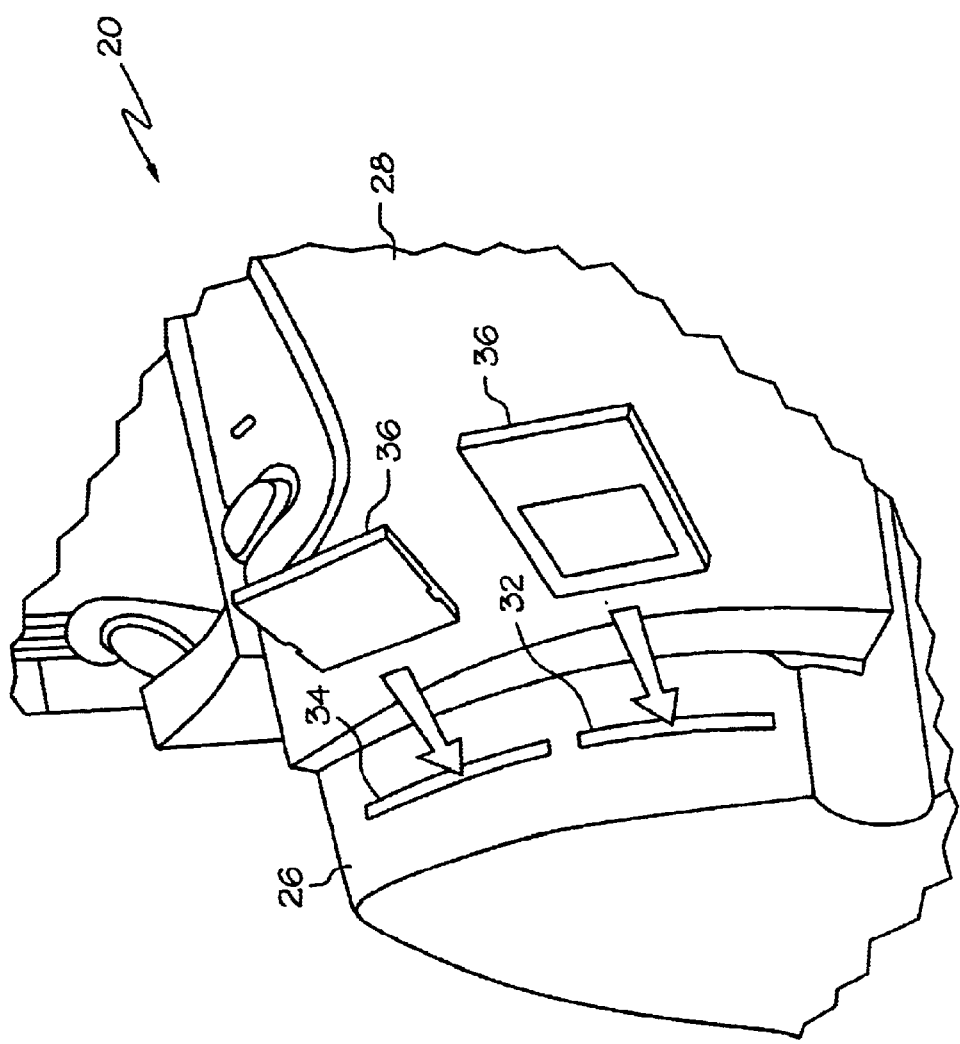
FIG. 2 is an enlarged perspective view of the first and second drives of the exemplary printer illustrated in FIG. 1, wherein two flash memory cards of the type typically used with digital cameras are illustrated for purposes of discussion.

In a preferred embodiment, the first and second drives 32 and 34 are each adapted to receive a solid state flash memory card 36, as shown in FIG. 2. The first and second drives 32 and 34 are preferably both internal drives, as shown. Flash memory cards, due to their very small size and lightweight, are a highly portable computer readable medium which are electrically rewritable but which can retain data in the absence of power (i.e., are non-volatile). More preferably, the first and second drives 32 and 34 are adapted to receive different types of flash memory cards, such as a NAND type of flash memory card (e.g., a SMART MEDIA™ card developed by Toshiba, Inc.) or a PCMCIA type of flash memory card (e.g., the COMPACTFLASH™ developed by SanDisk, Inc.). Presently, these flash memory cards have a data storage capacity of up to about 48 megabytes and are capable of temporarily storing tens or hundreds of images, depending upon image resolution. While the first and second drives 32 and 34 have been described herein as receiving a flash memory card 34, it is contemplated that new, compact and lightweight computer readable media which are suitable for use with digital devices, such as cameras and scanners, may replace these flash memory cards. As such, it is contemplated that the first and second drives 32 and 34 may be adapted to receive types of portable computer readable media other than those described herein.

Figure 3:
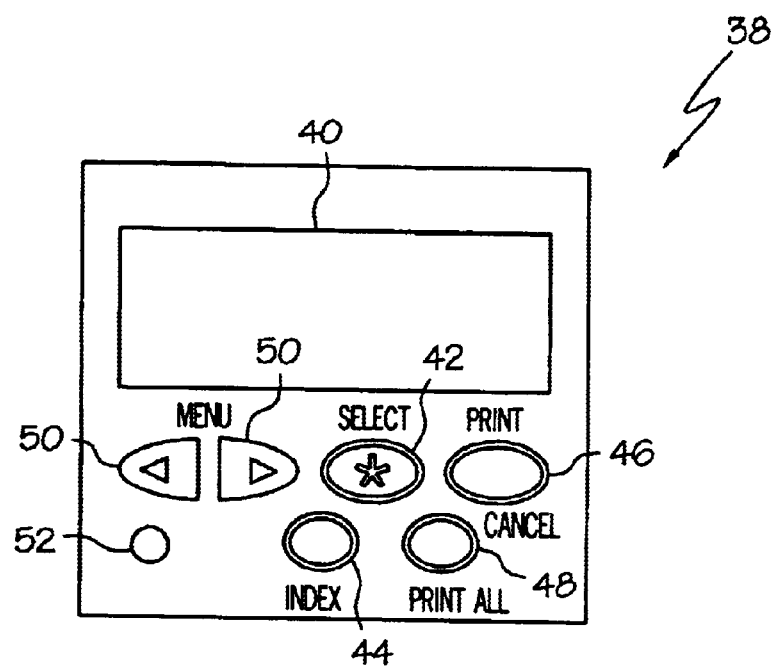
FIG. 3 is an enlarged view of the user interface of the exemplary printer of FIG. 1

Referring to FIGS. 1 and 3, the printer 20 also comprises a user interface 38 having a display 40, such as a liquid crystal display or LCD, and a plurality of activating members (e.g., buttons, toggles, etc.) For selecting and initiating printer functions. More preferably, the user interface 38 comprises a "select" button 42, an "index" button 44, a "print" button 46, and a "print all" button 48. The user interface 38 also comprises two menu scroll buttons 50 for stepping through a series of menus which are displayed on the display 40 of the user interface 38, as described more fully hereafter. One or more indicating lights 52 can also be provided for indicating the status of the printer 20 during use.

As best seen in FIG. 4, the printer 20 also has an input/output port and, more preferably, an external parallel port 54 which is located on the rear face of the housing 26. The parallel port 54 is used to directly interconnect the stand-alone printer 20 with a third drive 56 for use with a high capacity computer readable medium 58 and/or a computer system 60 (FIG. 5) having a computer 62. While the third drive 56 is illustrated as an external drive, it is contemplated that the third drive 56 can also be provided as an internal drive and that the external parallel port 54 can be provided as an internal port or other structure (e.g., a universal serial bus port or USB) for interconnecting the third drive 56 with the printer 20. Further, the printer 20 can be provided with more than one high capacity drive 56 for archival storage of the graphic files and more than one input/output port, especially where the third drive 56 is provided as an internal drive. The third drive 56 and/or computer 62 are interconnected with the printer 20 by a parallel cable 64. As used herein, the phrase "high capacity" is intended to refer to a device which is capable of storing more data than the computer readable media used in connection with the first and second drives 32 and 34. Preferred high capacity storage devices include magnetic disk drives or diskette drives, such as the ZIP™ Parallel drive manufactured by Iomega, Inc., because these drives provide a lower cost per byte ratio than the more portable flash memory cards. The computer 62 can be provided in the form of any conventional or special purpose computer, such as a desktop computer, a tower computer, a micro-computer, a mini-computer as well as a palmtop computer, notebook computer or the like.

Figure 6:
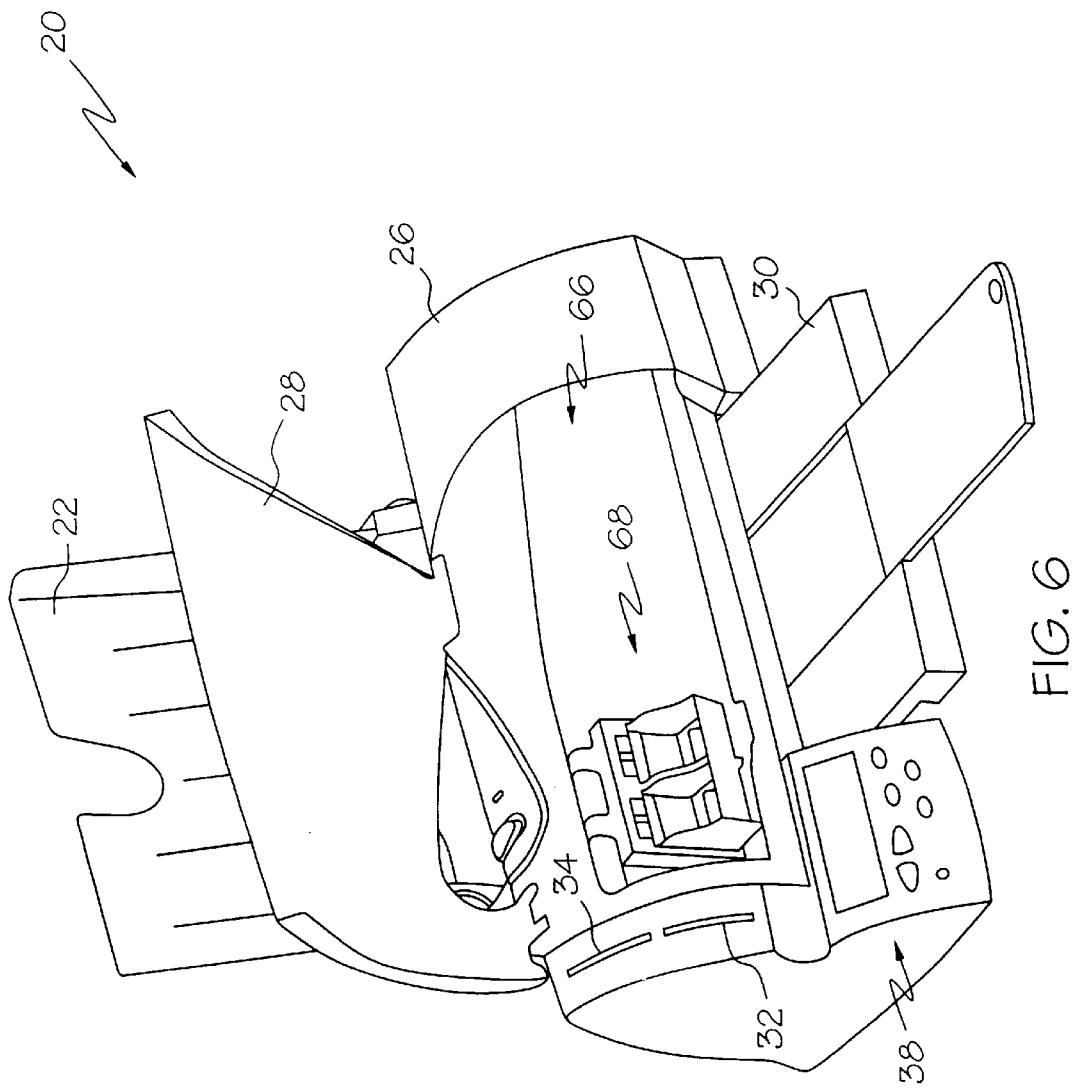
FIG. 6 is a perspective view of the exemplary printer of FIG. 1, wherein the cover is raised to expose certain details thereunder.

Referring to FIG. 6, the printer 20 is illustrated with the cover 28 rotated its open position, thereby exposing a printing compartment 66. The printer 20 is preferably provided in the form of a six color thermal ink jet printer having two conventional thermal three-color ink jet print heads 68 (illustrated without their ink cartridges) disposed within the printing compartment 66 and conventional means (not shown) for handling and advancing the sheets 24 past the print head 68 and through the printer 20. During printing, a sheet 24 is moved longitudinally relative to the printer 20 so that it is properly positioned within the printing compartment 66 for deposition of an ink pattern or swath across the sheet 24. Once the sheet 24 is in position, the print head 68 moves along a conventional print head carriage (not shown) in a direction transverse to the longitudinal direction while firing droplets of ink onto the sheet's surface. The print head 68 may make one or more of these transverse passes to complete printing for the swath. After the swath is complete, the paper's position is adjusted longitudinally for the printing of the next swath. These portions of the printer 20 will not be described in greater detail herein, although additional details can be found in U.S. Pat. Nos. 5,684,516 issued to Cseledy et al. on Nov. 4, 1997; 5,661,510 issued to Brandon et al. on Aug. 26, 1997; and 5,627,572 to Harrington, III et al., these patents being hereby fully incorporated by reference herein.

While the printer 20 is described herein with respect to a conventional six-color thermal ink jet printer, it is contemplated that the present invention can be adapted for use with other types of ink jet printers which are capable of producing an ink pattern on one or more of the sheets 24. For instance, other ink jet technologies, such as piezo ink jet, would be suitable for use with the present invention. In addition, the present invention can be adapted for use with other printer technologies, such as electrophotography, dye diffusion, and thermal transfer.

Figure 7:
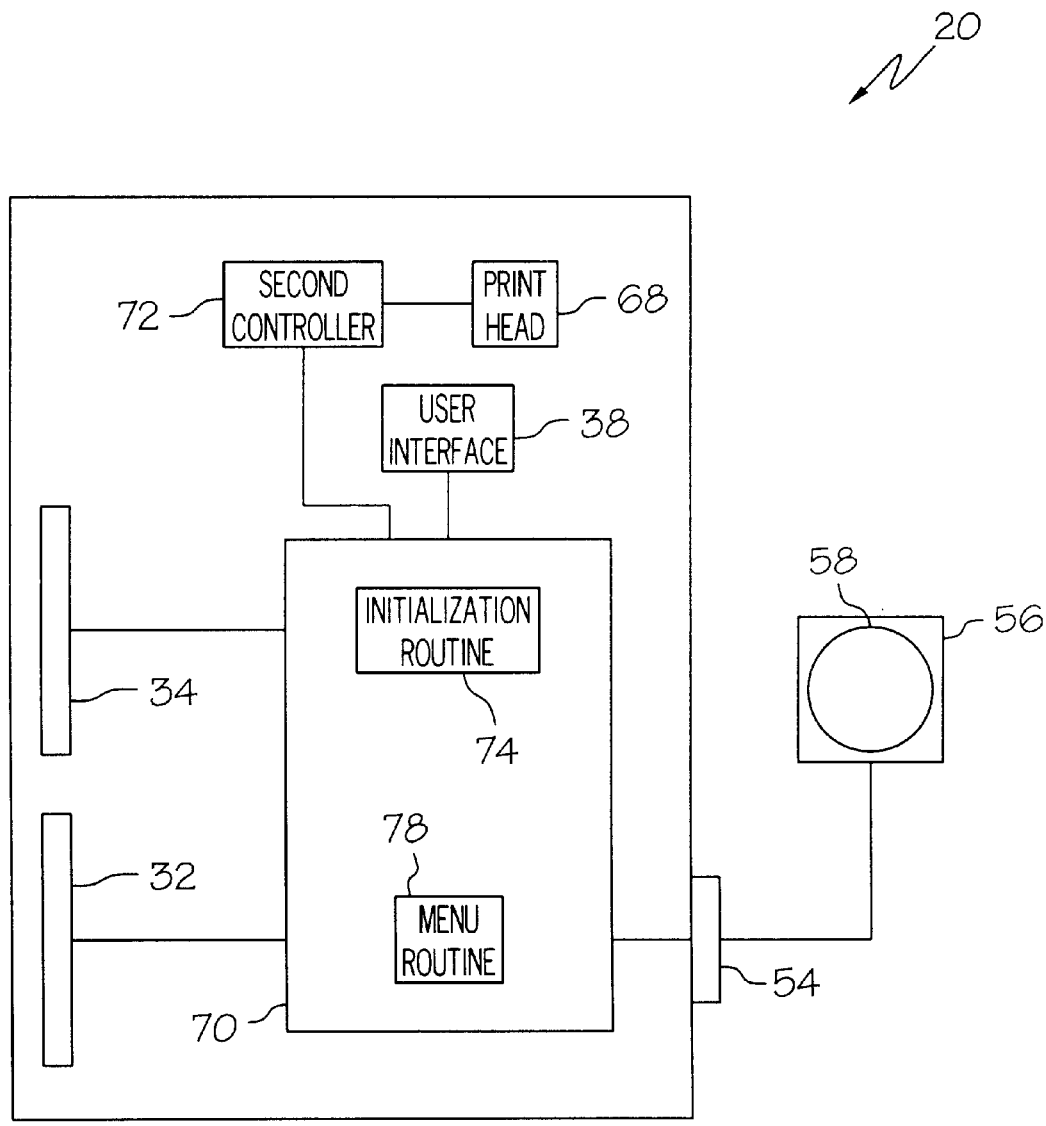
FIG. 7 is a schematic illustration of the exemplary printer of FIG. 1.

Referring now to FIG. 7, the printer 20 is illustrated in its "stand-alone" mode, wherein it is connected to the third drive 56 rather than the computer system 60. The printer 20 is illustrated as further comprising a first controller 70 which interfaces with the parallel port 54, the first drive 32, the second drive 34, and the user interface 38. A second controller 72 interfaces and controls movement and operation of the print head 68 and the associated mechanisms (not shown) for feeding the sheets 22 through the printer 20. The first controller 70 preferably has an initialization routine 74 and a menu routine 78. These routines can be implemented by an Application Specific Integrated Circuit (ASIC) or a microprocessor, as desired. While the printer 20 is illustrated as comprising a first and second controller, it will be understood that the functions of these controllers can be combined or reorganized as desired without departing from the scope of the invention.

Figure 8:
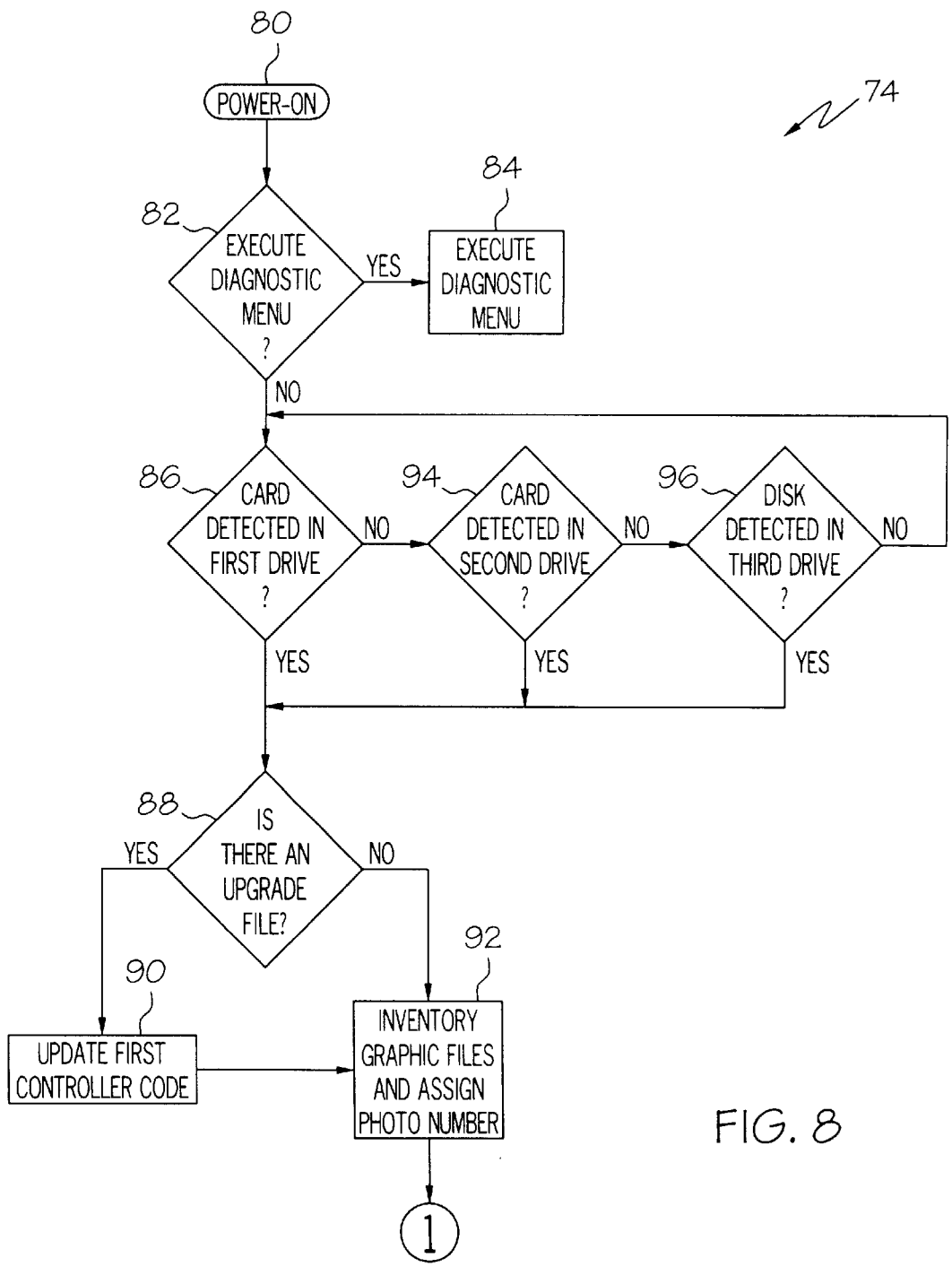
FIG. 8 is a schematic illustration of an exemplary initialization routine illustrated in FIG. 7.
Figure 9:
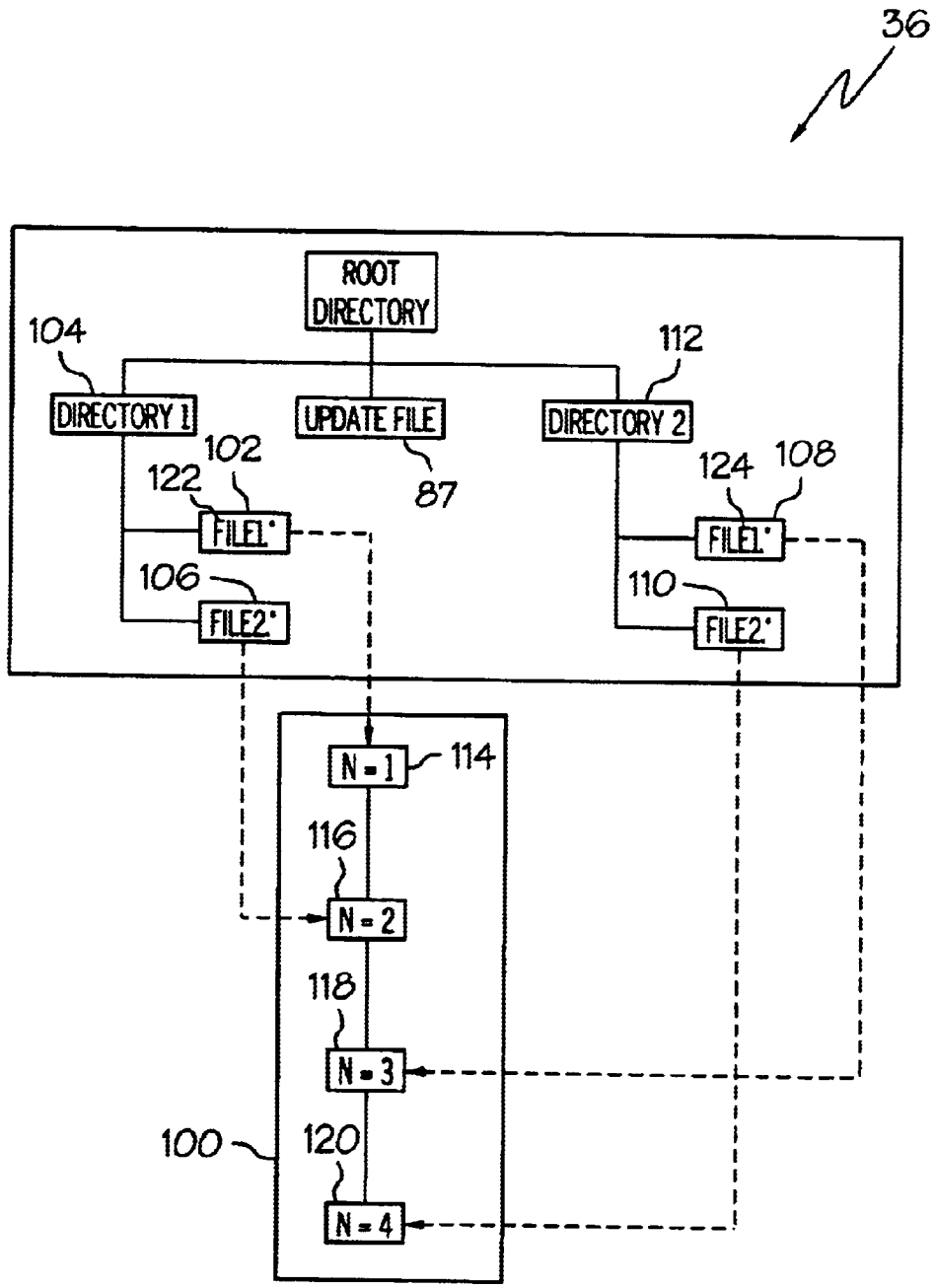
FIG. 9 is a schematic illustration of exemplary files on a flash memory card and of a graphic file index.

Referring to FIGS. 8 and 9, the initialization routine 74 is initiated when power is first supplied to the printer 20 as shown in block 80. Preferably, the initialization routine 74 begins execution with block 82, wherein it is determined whether a user of the printer 20 has selected execution of a diagnostic menu. If the diagnostic menu is selected (such as, by example, simultaneously pressing buttons 44 and 46 when power is first applied to the printer 20), execution passes to block 84. The diagnostic menu, which would be displayed on the display 40 of the user interface 38, can be used to trouble-shoot and/or interrogate the status of printer 20. For instance, the diagnostic menu can be used to run tests of static and/or dynamic memory chips of the first controller 70, display the level (or revision) of code installed in the first controller 70, or run diagnostic tests of the parallel port 54, the first drive 32, the second drive 34, or the third drive 56. If the diagnostic menu has not been selected by a user of the printer 20, execution passes to block 86 where the first drive 32 is queried to determine if a flash memory card (e.g, 36 of FIG. 2) is inserted therein. For purposes of discussion herein, a drive having a computer readable medium disposed therein which is detected by the first controller 70 will be referred to herein as an active drive. If a flash memory card is detected, execution passes to block 88 where the flash memory card is accessed to determine if there is an update file 87 (FIG. 9) disposed thereon.

The update file 87 can be supplied by a manufacturer of the printer 20 to provide a convenient and simple means for updating all or portions of the code (e.g., the menu routine, etc.) of the first controller 70, as described in block 90. The update file 87 can be used to provide patches for the code of the first controller 70, specialty printing formats (e.g., unique texts on frames), new color tables to better support specialty photopapers, upgrades and new functionality, or to update the graphic file formats which can be processed by the first controller 70. The update file 87 can be provided on a flash memory card directly by a manufacturer of the printer 20. Alternatively, the update file 87 can be copied from the computer 62 to a flash memory card 36 installed in one of the first drive 32 or second drive 34 or to a disk installed in the third drive 56, after which the update file can be detected by the first controller 70 as described in blocks 86, 94 or 96. If an update file is not located, execution passes to block 92 where the memory card 36 is inventoried to determine the number and type of graphic files present thereon, as described more fully hereafter.

Returning to block 86, if a flash memory card is not detected in the first drive 32, execution passes to block 94 where the second drive 34 is queried to determine whether a flash memory card is disposed therein. If a flash memory card is located in the second drive 34, execution again passes to block 88, as previously described. Otherwise, execution passes to block 94 if a flash memory card is not detected in the second drive 34. In block 96, the parallel port 54 is queried to determine if the third drive 56 having a high capacity computer readable disk 58 is connected to the parallel port 54. If such a drive is detected, execution passes to block 88; otherwise, execution returns to block 86, as shown, preferably either immediately or after a predetermined delay. Alternatively, an error code or textual message can be displayed on the display 40 of the user interface 38 indicating that neither a card or disk can be found.

Once a drive and its attendant computer readable medium are detected and the update file decision blocks 88 and/or 90 have been performed, execution passes to block 92 where a search of the computer readable medium disposed in the active drive is made for any graphic files located thereon. Each graphic file preferably comprises a digital representation of an image captured by a digital camera or scanner.

Figure 10:
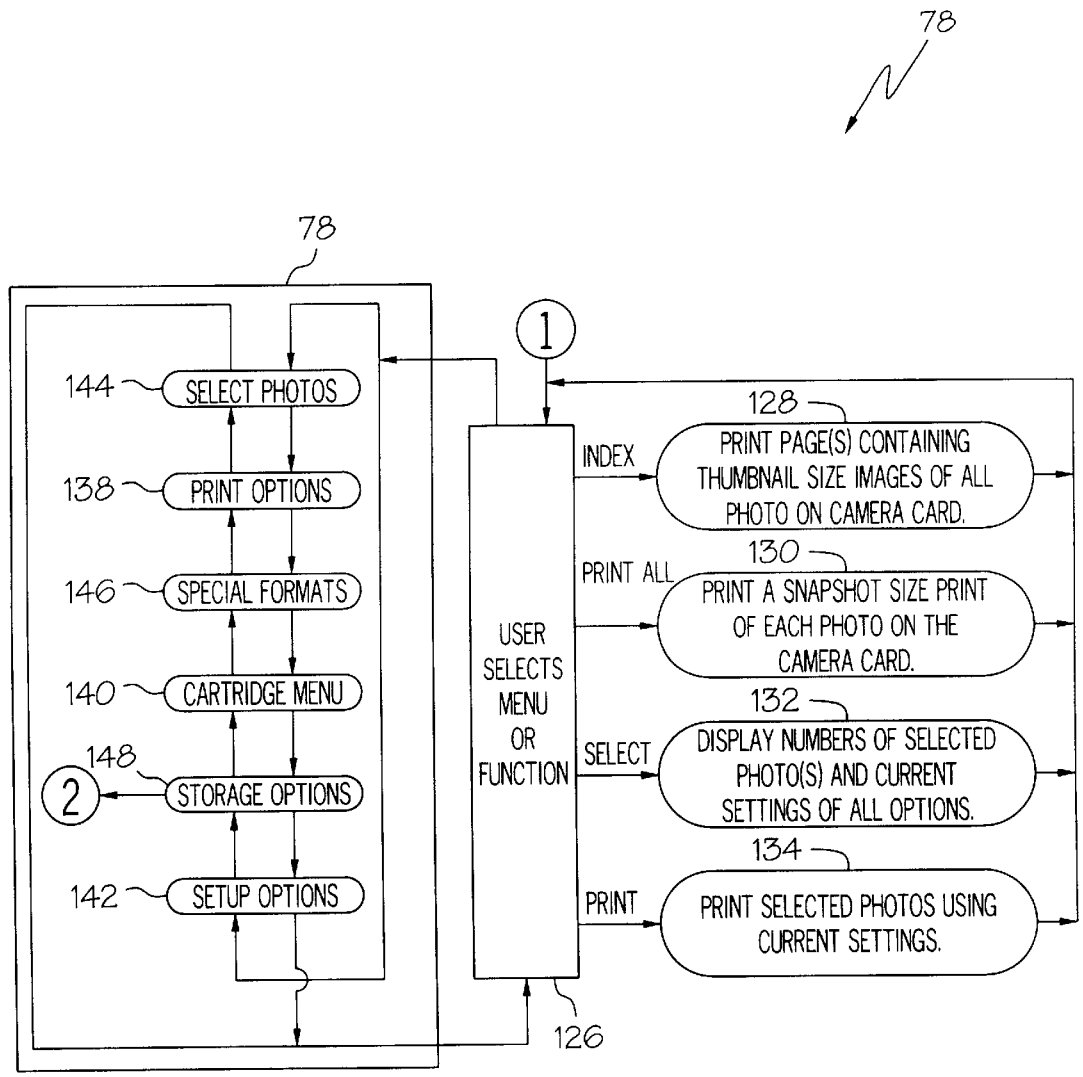
FIG. 10 is a schematic illustration of an exemplary menu routine illustrated in FIG. 7.

Examples of graphic file formats which can currently be used to store such a digital representation include JPEG, EXIF, CIFF, and JFIF file formats, although other graphic file formats may be equally suitable or become available in the future. If one or more graphic files are located at the active drive on its computer readable medium (e.g., a flash memory card or high capacity disk), a graphic file index 100 is created, as shown in FIG. 9. The graphic file index 100 is created by sequentially stepping through each directory located of the computer readable medium disposed in the active drive and assigning a photo number N to each graphic file located. For example, graphic file 102 under the directory 104 of the exemplary flash memory card 36 of FIG. 9 would have a photo number 114 (i.e., N=1) associated therewith while the graphic file 110 of directory 112 would have a photo number 120 (i.e., N=4) associated therewith, as shown in FIG. 9. The file index 100 can be stored as an array by the first controller 70. Each graphic file on the computer readable medium disposed in the active drive preferably has a photo number associated therewith, because, as shown in FIG. 10, some digital devices may save different images under the same file descriptor (e.g., 122 and 124), albeit under different directories. As such, the graphic file descriptor assigned by a digital device for a specific image captured by that device may not be a unique descriptor. In addition, as files are saved by the third drive 56 to its high capacity disk 58, distinct images may also have the same file descriptor as, for example, the flash memory card is erased and used again by the same digital device and the same file descriptors are repeated for new images captured by the device. Thus, the graphic file index 100 provides an easy and convenient means for selecting graphic files for printing when the printer 20 is operating in a stand-alone mode without the benefit of the directory and file manipulation utilities typically available when a printer is attached to a computer system.

While the steps of querying the first drive 32, the second drive 34, and the third drive 36 and the creation of the graphic file index 100 have been described herein with respect to the initialization routine 74 when power is first applied to the printer 20, it is contemplated that the foregoing steps can be performed according to a timed schedule rather than just when power is first supplied. For example, a clock can be used to execute he steps of blocks 86 to 98 at a periodic interval. In addition, it will be understood that the photo number described herein can also be provided in the form of any alphabetic, numeric or character descriptor, as desired.

Referring to FIGS. 8 and 10, execution next passes to block 126 (FIG. 10) of the menu routine 78 after inventorying the computer readable medium disposed in the active drive in block 92 of FIG. 8. At block 126, a user of the printer 20 can input commands through the user interface 38 directing operation of the printer 20 (e.g., selection of images, printing of images, formatting of images, etc.). For instance, once execution passes to block 126, the buttons 42 to 46 become active so that a user of the printer 20 can perform certain operations by activation of a single button. The "index" button 44 preferably prints a set or collection of thumbnail of the images (i.e., images of substantially reduced size), wherein each thumbnail image is associated with one of the graphic files (e.g., 102, 106, 108, 110) stored on a computer readable medium disposed in any one of the first drive 32, the second drive 34, or the third drive 56, as described in block 128. This set of thumbnail images can be printed on one or more of the sheets 24 depending upon the number of thumbnail images. Adjacent each thumbnail image is preferably printed its associated photo number (e.g., N=1, 2, 3, 4, etc.). This feature facilitates easy use of the printer 20, because it allows a user of the printer 20 to quickly determine which image is associated with a particular photo number independent of the digital device which recorded the image. Images can then be easily identified and selected for printing by merely designating the appropriate photo number. Activation of the "print all" button 48 initiates printing of a snapshot sized (e.g., 4 inches×6 inches) image for each graphic file stored on the computer readable medium disposed in the active drive, as shown in block 130. The "select" button 42 and "print" button 46 are used to select and print specific images with user selected formatting, respectively, as described in blocks 132 and 134.

As illustrated in block 126, a user of the printer 20 can also select any one of a number of submenus using the menu routine 70 to format and print the images associated with the graphic file disposed in the active drive. For instance, the print submenu described in block 138 can provide selectable options for the size of the sheet 24 on which the images are to be printed (e.g., A4, A6, 8.5 inches×11 inches, 4 inches×6 inches, etc.), the number of images per sheet from a preselectable group (e.g., 1, 2, 4, 4, 6, etc.), the number of copies to be printed, the type of sheets 24 which will be used (e.g., plain paper, coated paper, photopaper, etc.), the quality of the printing, etc. The cartridge submenu described in block 140 can be used for initiating installation, cleaning and alignment of the ink cartridges used by the print heads 68 while the setup submenu described in block 142 can be used to configure such general operational parameters, such as the language of the text displayed on the display 40 of the user interface 38.

A user of the printer 20 can select one or more of the images associated with the graphic files stored on the computer readable medium of the active drive for printing using the photo selection submenu described in block 144. For example, these images can be selected by using the photo number associated with each graphic file. The photo numbers can be correlated with a specific image through use of the thumbnail images printed in block 128, as previously described.

Figure 11:
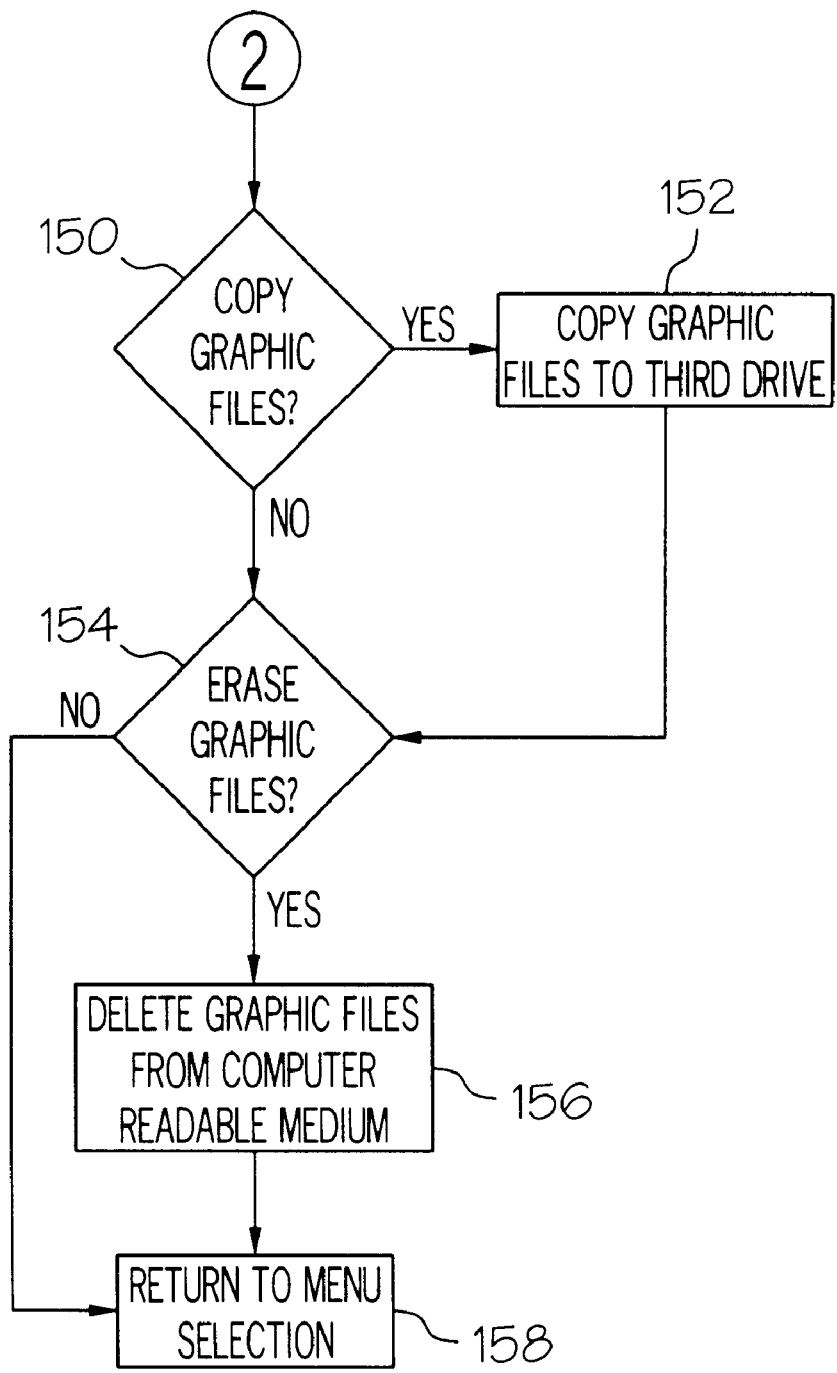
FIG. 11 is a schematic representation of an exemplary file storage menu illustrated in FIG. 10.

The storage menu described in block 148 is illustrated in greater detail in FIG. 11. In block 150, the user of printer 20 is prompted whether to copy the graphic files stored on the computer readable medium of either first drive 32 or second drive 34 to the third drive 54. The graphic files are then either copied in block 152 or execution next passes to block 154 where the user of the printer 20 is prompted as to whether the graphic files on the computer readable medium of either first drive 32 or second drive 34 should be erased. Execution then passes to either block 156 where the graphic files are erased or execution returns to the menu selection block 136 of FIG. 11, as described in block 158.

Figure 12:
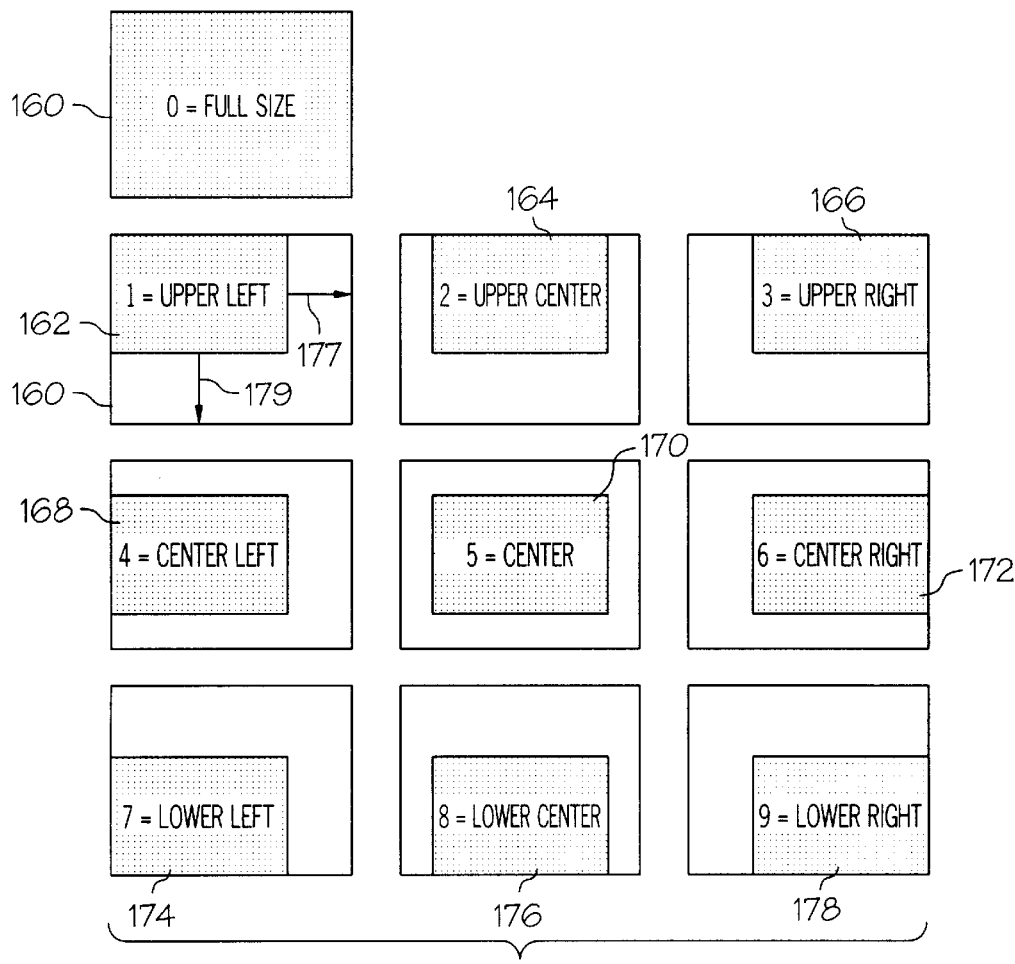
FIG. 12 is a schematic illustration of exemplary image formats selectable with the menu routine of FIG. 10.

The special formats submenu described in block 146 of FIG. 10 can provide the capability to format the images which will be printed. For example, frames and texts can be selected from the user interface 38 so that they are printed with the image. In addition, one or more of the images selected for printing can be cropped, wherein one of nine pre-defined quadrants of an image area is enlarged to fill the entire image area. For example, as shown in FIG. 12, a full image area 160 has a vertical length V and a horizontal length H within which an entire image captured by a digital device can be displayed. Nine predefined quadrants are illustrated in FIG. 12 as an upper left quadrant 162, an upper center quadrant 164, an upper right quadrant 166, a center left quadrant 168, a center quadrant 170, a center right quadrant 172, a lower left quadrant 174, a lower center quadrant 176 and an lower right quadrant 178. Each quadrant has horizontal and vertical lengths which are less than the full image area 160 such that the entire image has been cropped, although the cropped image can be enlarged when printed so as to fill the entire image area 160, as shown by arrows 177 and 179. This predefined feature provides a simple means for implementing image enlargement or a zooming function from a stand-alone printer using the special formats menu and/or buttons of the user interface 38.

Figure 13:
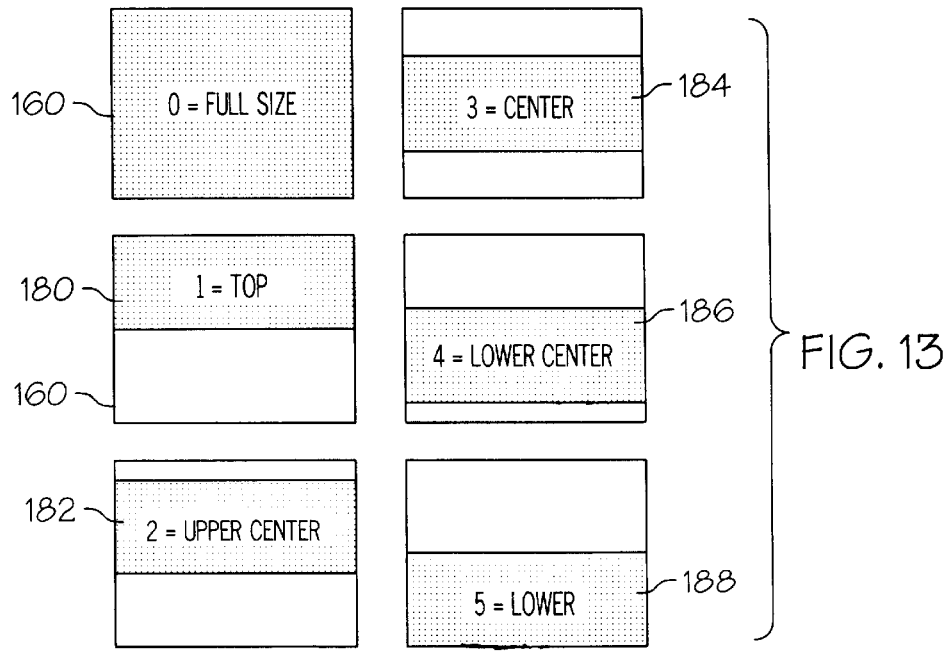
FIG. 13 is a schematic illustration of additional exemplary image formats selectable with the menu routine of FIG. 10.

An image can also be preferably formatted into one of five predefined panorama views, as shown in FIG. 13, wherein a longitudinal section of the image area is printed. This longitudinal section preferably has the same horizontal length H as the original image area, as shown, but has a vertical length which is less than the vertical length V of the full image area 160. For example, the panorama views can include a top panorama 180, an upper center panorama 182, a center panorama 184, a lower center panorama 186 or a lower panorama 188. The predefined panorama feature provides a means for focusing an image in a more horizontally centric aspect than provided by the more conventional vertical to horizontal aspect ratios of traditional film photography.

Figure 5:
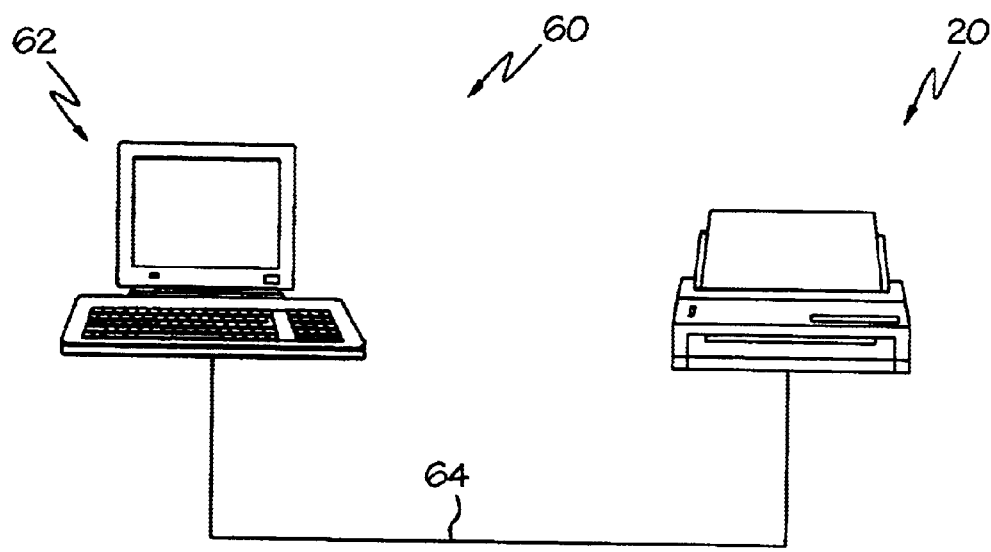
FIG. 5 is a schematic illustration of the exemplary printer of FIG. 1, interconnected with a computer system.

In accordance with another aspect of the present invention, a preferred method 189 for managing data flow to and from the first controller 70 will now be described with reference to FIG. 14. As previously discussed, the parallel port 54 of the printer 20 can either be connected to the third drive 54 (FIG. 4) or the computer 62 (FIG. 5). While the printer 20 has so far been principally described in its "stand-alone" mode, wherein the parallel port 54 is interconnected with the third drive 56 for providing a high capacity archival storage capability, the printer 20 also preferably can be interconnected with a computer 62 as previously described and as illustrated in FIG. 5. When the printer 20 is interconnected with the computer 62, the computer 62 is preferably adapted to interface with the first and second drives 32 and 34 so that it can utilize a computer readable media disposed therein as additional memory. Because the printer 20 can receive read/write/print commands from the computer 62 when it is attached thereto and can also receive read/write/print commands simultaneously from its own user interface 38, the data management method 189 is useful for coordinating data flow through (i.e., into and out of) the first controller 70 to each of its interconnected elements (e.g., the first and second drives, the parallel port, the print head via the second controller, etc.). This data management function is operative regardless whether the printer 20 is interconnected with the third drive 54 or the computer 62 (i.e., operating in its stand-alone or attached modes).

Figure 14:
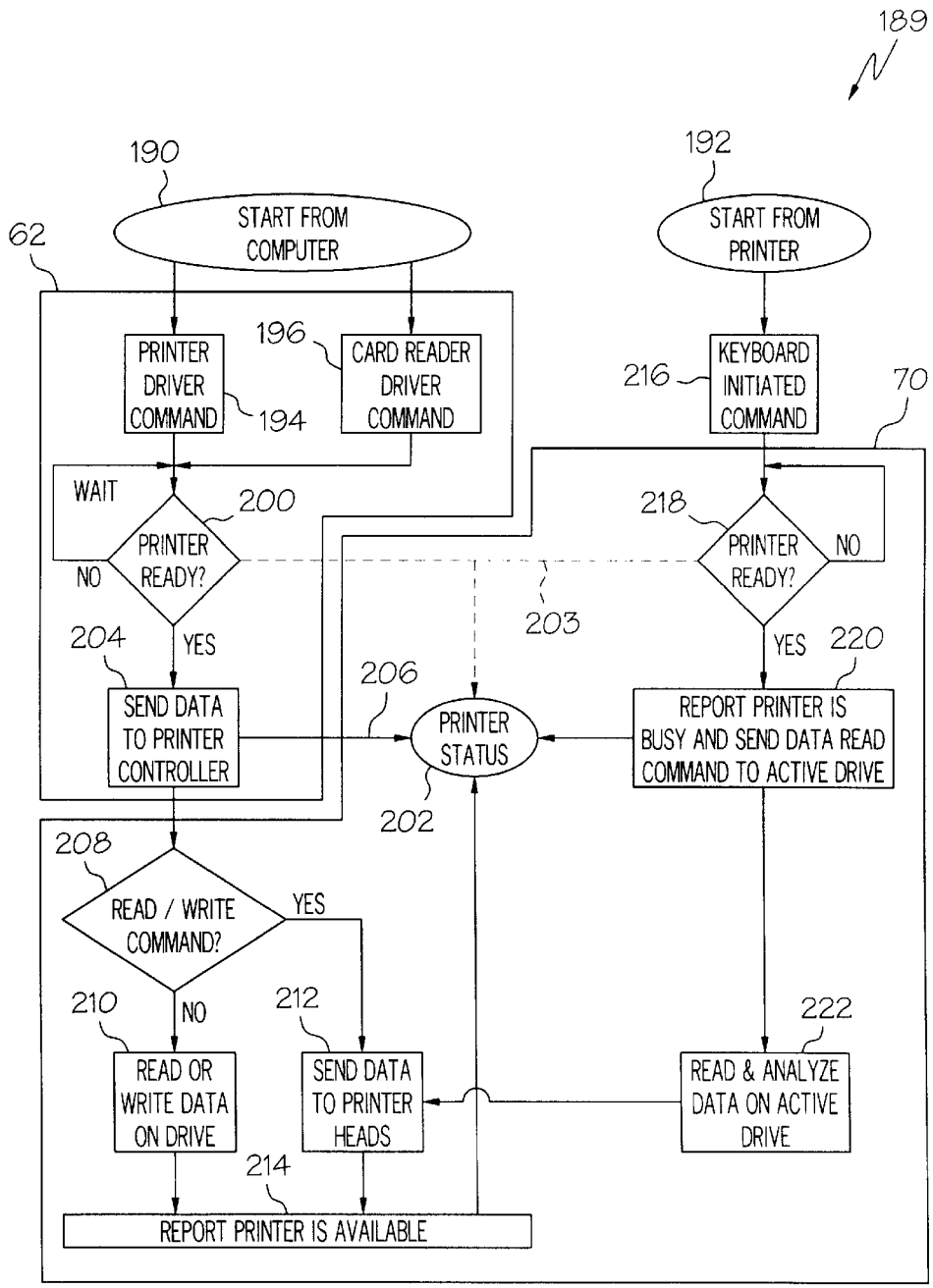
FIG. 14 is a schematic illustration of an exemplary data management method for use with printer of FIG. 4 and the computer system of FIG. 5.
Figure 14:
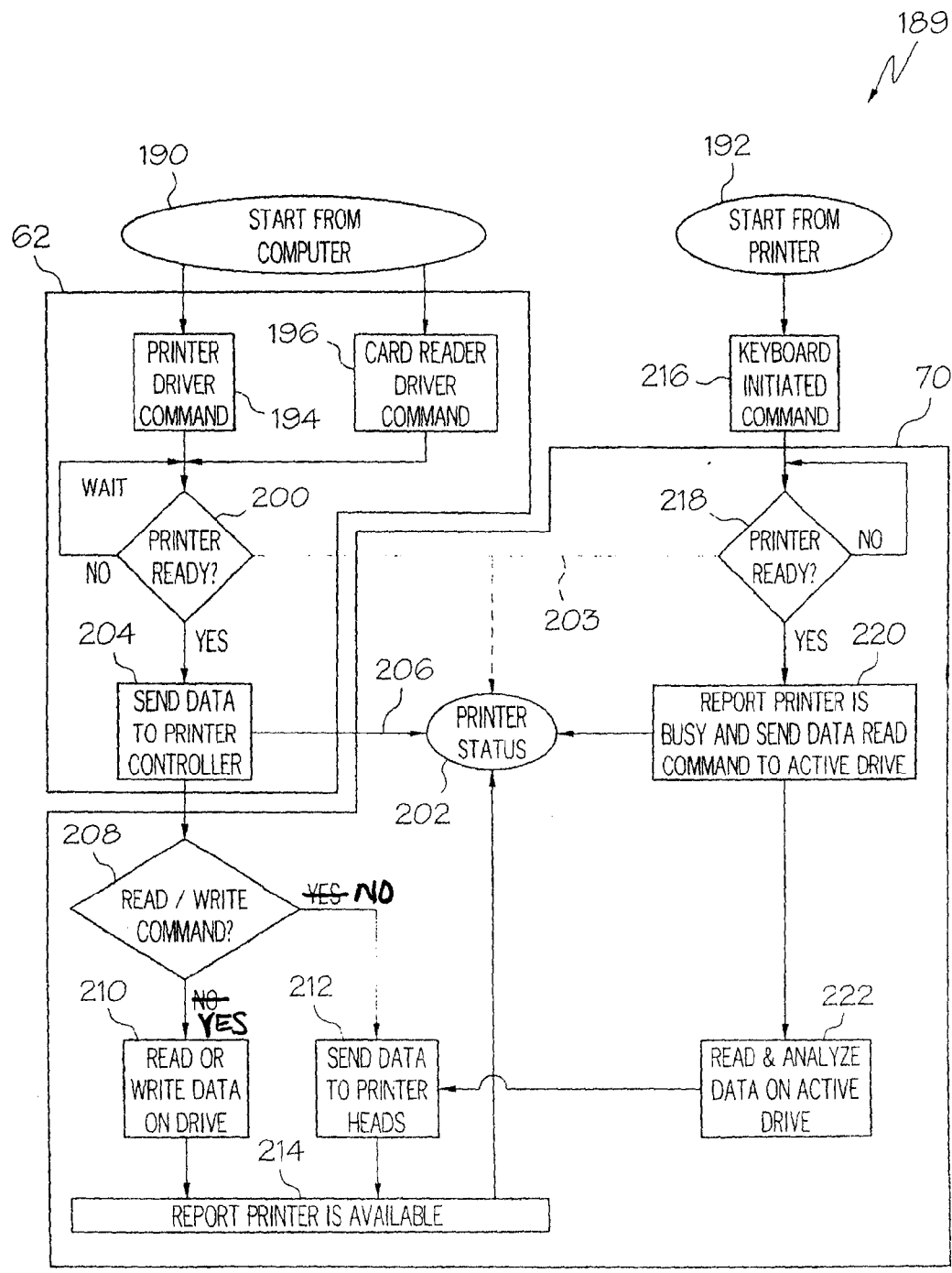

As shown in FIG. 14, commands to the first controller 70 can be initiated from either the computer 62, as described in block 190, or from the user interface 38 of the printer 20, as described in block 192. Beginning with commands from the computer 62, a print command can be initiated from block 194 or a read/write command can be initiated from block 196. A printer driver or a card reader driver, which can be provided as part of the computer's operating system, can be used to initiate the print command or the read/write command, respectively. Execution next passes to block 200 from either of blocks 194 or 196, where the status of the printer 20 is queried to determine if the first controller 70 is already busy processing data commands or responses thereto (e.g., other read/write/print commands, status inquiry commands, etc.) from the printer 20 or the computer 62. The printer status can be maintained in block 202 at the printer 20 and can be queried by either the first controller 70 or the computer 62, as shown by the dashed line 203. If the printer 20 is not busy, execution passes to block 204 where the read/write/print command is sent to the first controller 70 of the printer 20 across the cable 64 (FIG. 5); otherwise, execution remains with block 200 until the printer status of block 202 is updated to reflect that the first controller 70 is no longer processing a command. If the first controller 70 is not busy processing a command (i.e., the printer is ready), execution passes 204 where the printer status is updated to show that the first controller 70 is processing a command from the computer 62, as shown by arrow 206, and the data associated with the read/write/print command is sent to the first controller 70 of the printer 20. This updating can be accomplished by the first controller 70 when the execution of blocks 210 or 212 occur, as described hereafter, or the printer status of block 202 can be updated by the computer 62 sending an update message to the printer 20.

At the printer 20, the read/write/print command from the computer 62 is received at block 208, where the data stream is queried to determine if the command is a read/write command (in which case execution passes to block 210) or a print command (in which case execution passes to block 212). In blocks 210 and 212, the appropriate action is implemented to either read/write to the active drive or to instruct the print heads 68 to print the appropriate image(s). Upon completion of blocks 210 or 212, execution passes to block 214 where the printer status of block 202 is updated to show that the first controller 70 is no longer processing a command.

Referring back to block 192, a print command can also be initiated from the printer 20 when the printer 20 is operating in its attached mode (i.e., connected to the computer 62). After the print command is initiated at block 216 from the user interface 38, execution passes to block 218 where the printer status of block 202 is again queried, as shown by the dashed line 203. If the printer status is busy (e.g., the first controller 70 is already processing a read/write/print command from the computer 62 in blocks 210 or 212 or an earlier read/write/print command from the user interface 38 in these same blocks), execution remains with block 218 until the printer status of block 202 is updated to reflect that the first controller 70 of the printer 20 is no longer processing a command. If the first controller 70 of the printer 20 is not busy, execution passes to block 220 where an update of the printer status is sent to block 202 to reflect that the first controller 70 is processing the command initiated at block 216. In addition, a read command is sent to the active drive to access the graphic file(s), which are the subject of the print command. In block 222, the graphic file(s) on the active drive are read and this data interpreted so as to send the appropriate print instructions to the printer heads 68 in block 212. As will be appreciated, the print instructions of block 212 can be first sent to the second controller 72 (FIG. 7), which preferably controls operation of the printer heads 68. While the above described method 189 has been illustrated and described herein with respect to a printer 20 operating in its attached mode, blocks 192, 216 and those within the first controller 70 would still be operative if the printer 20 were operating in its stand-alone mode, although blocks 220 and 222 would also provide for the execution of a write command to the third drive 56 which would be attached to the printer 20 through the parallel port 54.

Having shown and described the preferred embodiments of the present invention, further adaptations of the printer described herein can be accomplished by appropriate modification by one of ordinary skill in the art without departing from the scope of the present invention. For example, the first and/or the second drive and the third drive can be combined into a single unit, wherein the first, second and third drives combination is disposed externally. Alternatively, the first, second and/or third drives can be each disposed externally as a separate unit, wherein each drive is connected to the stand-alone printer by way of a separate or shared port. In addition, it is contemplated that the first and/or second drives can be combined as part of the digital device and a cable (or other method of interconnection, such as infrared data transmission) can be used to interconnect the first and/or second drives with a standalone printer having the third drive. Accordingly, the scope of the present invention should be considered in terms of the following claims and is understood not to be limited to the details of structure and operation shown and described in the specification and drawings.

What is claimed is:

1. A stand-alone printer, comprising:
   a user interface;
   a drive for interfacing with a computer readable medium, wherein the computer readable medium is capable of transferring at least one digital representation of an image captured by an external digital device; and
   a printing member for producing on a substrate a pattern associated with the digital representation of the image captured by the digital device;
   wherein the stand-alone printer is configured to operate independent of a computer system, and can coordinate data flow when the printer receives a command from a computer system in communication with the printer and a command from the user interface.

2. The stand-alone printer of claim 1, wherein the drive is adapted to receive a flash memory card.

3. The stand-alone printer of claim 1, wherein the drive is adapted to receive a magnetic disk.

4. The stand-alone printer of claim 1, wherein the user interface has an activating member and wherein the computer readable medium is capable of storing a plurality of digital representations associated with a plurality of images captured by the digital device, wherein activation of the activating member instructs the printing member to produce a plurality of patterns, each of the patterns being associated with one of the plurality of digital representations.

5. A stand-alone printer, comprising:
   a user interface;
   a drive for interfacing with a computer readable medium, wherein the computer readable medium is capable of transferring at least one digital representation of an image captured by an external digital device;
   a printing member for producing on a substrate a pattern associated with the digital representation of the image; and
   a controller having a set of instructions for interpreting the digital representation stored on the computer readable medium, wherein the set of instructions interface and control movement of the printing member to produce the pattern associated with the digital representation of the image,
   wherein the stand-alone printer is configured to operate independent of a computer system, and can coordinate data flow when the printer receives a command from a computer system in communication with the printer and a command from the user interface.

6. The stand-alone printer of claim 5, wherein the user interface has an activating member, wherein activation of the activating member instructs the controller to select a plurality of sets of instructions, wherein each set of instructions interface and control movement of the printing member to produce a set of patterns associated with the digital representation of the image.

7. The stand-alone printer of claim 5, wherein the controller is adapted to update the set of instructions using data received from the drive.

8. The stand-alone printer of claim 5, further comprising a communication link between the digital device and the drive of the stand-alone printer.

9. The stand-alone printer of claim 8, wherein the communication link comprises a wireless communication link.

10. The stand-alone printer of claim 6, wherein the user interface comprises a liquid crystal display (LCD).

11. The stand-alone printer of claim 6, wherein the drive is adapted to receive a flash memory card.

12. The stand-alone printer of claim 1, wherein the printing member is capable of processing the digital representation of the image.

13. The stand-alone printer of claim 12, wherein processing the digital representation comprises providing for printing an area of the image so that less than an entire area of the image is printed.

14. The stand-alone printer of claim 1, wherein the stand-alone printer is configured to create a graphic file index corresponding to each of a plurality of digital representations on the computer readable medium.

15. The stand-alone printer of claim 4, wherein the plurality of patterns comprises a plurality of thumbnail images.

16. The stand-alone printer of claim 15, wherein a different number is printed adjacent each of the thumbnail images, and wherein a non-thumbnail image associated with one of the thumbnail images can be selected for printing with knowledge of a corresponding one of the numbers.

17. A stand-alone printer, comprising:
   a first drive for interfacing with a computer readable medium, wherein the computer readable medium is capable of transferring at least one digital representation of an image captured by an external digital device and wherein the computer readable medium is adapted to interface with the digital device;
   a printing member for producing on a substrate a pattern associated with the digital representation of the image captured by the digital device;
   a plurality of ports, wherein at least one of the ports is capable of transmitting data to and from the printer, and wherein at least one of the ports is capable of interfacing with a second drive.

18. A stand-alone printer, comprising:
   a first drive for interfacing with a computer readable medium, wherein the computer readable medium is capable of transferring at least one digital representation of an image captured by an external digital device and wherein the computer readable medium is adapted to interface with the digital device;
   a printing member for producing on a substrate a pattern associated with the digital representation of the image captured by the digital device; and
   a port for transmitting data to and from the printer, wherein the printer is adapted to interface with a second drive through the same port.

19. A printer comprising
   a port for transmitting data to and from the printer; and
   a drive for interfacing with a computer readable medium, wherein the computer readable medium is capable of transferring at least one digital representation of an image captured by an external digital device and wherein the computer readable medium is adapted to interface with the digital device,
   wherein a computer readable medium interfaced with the drive can be written to by a computer in communication with the printer.

20. A stand-alone printer, comprising:
   a drive for interfacing with a computer readable medium, wherein the computer readable medium is capable of transferring at least one digital representation of an image captured by an external digital device, wherein the computer readable medium is adapted to interface with the digital device and wherein the image has a first vertical length and a first horizontal length;
   a printing member for producing a pattern on a substrate associated with the digital representation of the image captured by the digital device; and
   wherein the printer is adapted to print the image with a second horizontal length which is less than the first horizontal length so that less than the entire image is printed.

21. A stand-alone printer, comprising:
   a drive for interfacing with a computer readable medium, wherein the computer readable medium is capable of transferring at least one digital representation of an image captured by an external digital device, wherein the computer readable medium is adapted to interface with the digital device;
   a printing member for producing a pattern on a substrate associated with the digital representation of the image captured by the digital device; and
   a user interface configured to allow a user to select a desired area of the image to be printed, wherein the desired area can comprise less than an entire area of the image,
   wherein the printer is adapted to produce a pattern associated with the desired area of the image.

22. The stand-alone printer of claim 19, wherein the selection of the area of the image to print does not effect the captured digital representation.

* * * * *

UNITED STATES PATENT AND TRADEMARK OFFICE
CERTIFICATE OF CORRECTION

PATENT NO. : 6,665,092 B2
DATED : December 16, 2003
INVENTOR(S) : William Henry Reed It is certified that error appears in the above-identified patent and that said Letters Patent is hereby corrected as shown below:

Drawings,
Sheet 12, Fig. 14 reverse the "YES" and "NO" labels on the lines from decision box 208 going to boxes 210 and 212.

Column 4,
Line 11, change reference numeral "34" to -- 36 --
Line 21, change the word "For" to -- for --

Column 7,
Line 21, change "Fig. 10" to -- Fig. 9 --
Line 44, change the word "he" to -- the --; and change reference numeral "98" to -- 96 --
Line 60, delete the phrase "of the"

Column 14,
Line 35, change "19" to -- 21 --

Signed and Sealed this

Twenty-fourth Day of August, 2004

JON W. DUDAS
*Director of the United States Patent and Trademark Office*